(12) United States Patent
Kartsaklis

(10) Patent No.: US 11,687,789 B2
(45) Date of Patent: Jun. 27, 2023

(54) DECOMPOSITION OF MACHINE LEARNING OPERATIONS

(71) Applicant: Apple Inc., Cupertino, CA (US)

(72) Inventor: Christos Kartsaklis, Campbell, CA (US)

(73) Assignee: Apple Inc., Cupertino, CA (US)

( * ) Notice: Subject to any disclaimer, the term of this patent is extended or adjusted under 35 U.S.C. 154(b) by 799 days.

(21) Appl. No.: 16/601,507

(22) Filed: Oct. 14, 2019

(65) Prior Publication Data

US 2020/0380375 A1 Dec. 3, 2020

Related U.S. Application Data

(60) Provisional application No. 62/855,850, filed on May 31, 2019.

(51) Int. Cl.
*G06N 3/10* (2006.01)
*G06N 3/08* (2023.01)
*G06N 3/04* (2023.01)

(52) U.S. Cl.
CPC ............... *G06N 3/10* (2013.01); *G06N 3/04* (2013.01); *G06N 3/08* (2013.01)

(58) Field of Classification Search
CPC .. G06N 3/10; G06N 3/04; G06N 3/08; G06N 3/0481; G06N 3/082; G06N 3/0454; G06N 3/105

See application file for complete search history.

(56) References Cited

U.S. PATENT DOCUMENTS

| 6,246,972 | B1 | 6/2001 | Klimasauskas |
| 9,886,663 | B2 | 2/2018 | Sarah et al. |
| 10,186,011 | B2 | 1/2019 | Nurvitadhi et al. |
| 10,467,795 | B2 * | 11/2019 | Sarel ................. G06N 3/02 |

(Continued)

FOREIGN PATENT DOCUMENTS

| CN | 105808454 | 7/2016 |
| WO | WO 2018/058426 | 4/2018 |

OTHER PUBLICATIONS

Jin et al. Split-cnn Splitting window-based operations in convolutional neural networks for memory system optimization. In Proceedings of the Twenty-Fourth International Conference on Architectural Support for Programming Languages and Operating Systems Apr. 4, 2019 (pp. 835-847). (Year: 2019).*

*Primary Examiner* — Boubacar Abdou Tchoussou
(74) *Attorney, Agent, or Firm* — BakerHostetler

(57) ABSTRACT

The subject technology receives a representation of a neural network (NN) model to be executed on an electronic device, the representation of the NN model including nodes corresponding to intermediate layers of the NN model. The subject technology determines, for the respective operation corresponding to each node in each respective intermediate layer of the NN model, a respective set of operations that are mathematically equivalent to the respective operation such that an aggregation of outputs of the respective set of operations is equivalent to an output of the respective operation. The subject technology generates a graph based on each respective set of operations, wherein the graph includes a set of branches, each branch includes a plurality of operations. The subject technology determines a respective order for executing each branch of the graph.

20 Claims, 7 Drawing Sheets

(56) References Cited

U.S. PATENT DOCUMENTS

| | | | |
|---|---|---|---|
| 11,023,803 B2 * | 6/2021 | Kalamkar | G06N 3/063 |
| 2001/0034628 A1 | 10/2001 | Eder | |
| 2005/0102657 A1 | 5/2005 | Lewi | |
| 2014/0136452 A1 | 5/2014 | Wellman | |
| 2014/0372513 A1 | 12/2014 | Jones | |
| 2015/0286471 A1 | 10/2015 | Raz | |
| 2016/0313991 A1 | 10/2016 | Wei | |
| 2017/0161604 A1 | 6/2017 | Craddock | |
| 2017/0364796 A1 | 12/2017 | Wiebe | |
| 2018/0088996 A1 | 3/2018 | Rossi | |
| 2018/0189642 A1 | 7/2018 | Boesch | |
| 2018/0204117 A1 | 7/2018 | Brevdo | |
| 2018/0239992 A1 | 8/2018 | Chalfin et al. | |
| 2018/0247197 A1 | 8/2018 | Tucker et al. | |
| 2018/0277246 A1 | 9/2018 | Zhong | |
| 2018/0293492 A1 * | 10/2018 | Kalamkar | G06N 3/0454 |
| 2018/0293777 A1 * | 10/2018 | Sarel | G06N 3/02 |
| 2018/0322387 A1 | 11/2018 | Sridharan et al. | |
| 2019/0056885 A1 | 2/2019 | Mathuriya et al. | |
| 2019/0073590 A1 | 3/2019 | Wu | |
| 2019/0130268 A1 | 5/2019 | Shiring et al. | |
| 2019/0156185 A1 * | 5/2019 | Li | G06N 3/082 |
| 2019/0156816 A1 | 5/2019 | Singh | |
| 2019/0164037 A1 | 5/2019 | Kim | |
| 2019/0236486 A1 | 8/2019 | Azab | |
| 2019/0279344 A1 | 9/2019 | Duggal | |
| 2019/0286973 A1 | 9/2019 | Kovvuri | |
| 2019/0318806 A1 | 10/2019 | Wise | |
| 2020/0042860 A1 * | 2/2020 | Sun | G06N 3/063 |
| 2020/0379740 A1 | 12/2020 | Paek | |
| 2022/0172072 A1 * | 6/2022 | Keller | G06N 3/0454 |

\* cited by examiner

DECOMPOSITION OF MACHINE LEARNING OPERATIONS

CROSS-REFERENCE TO RELATED APPLICATIONS

The present application claims the benefit of U.S. Provisional Patent Application Ser. No. 62/855,850, entitled "DECOMPOSITION OF MACHINE LEARNING OPERATIONS," filed May 31, 2019, which is hereby incorporated herein by reference in its entirety and made part of the present U.S. Utility Patent Application for all purposes.

TECHNICAL FIELD

The present description generally relates to machine learning operations, including decomposing machine learning operations for more efficient execution on a target platform.

BACKGROUND

Software engineers and scientists have been using computer hardware for machine learning to make improvements across different industry applications including image classification, video analytics, speech recognition and natural language processing, etc. Notably, neural networks are being utilized more frequently to create systems that can perform different computing tasks based on training from sizable amounts of data.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a meteoric rise in popularity in recent years due to the availability of massive amounts of training data, and advances in more powerful and efficient computing hardware. One prevalent machine learning technique is utilizing a deep neural network to perform a set of machine learning tasks. For training a deep neural network, a common approach is utilizing a graphical processing unit (GPU), and also for executing the deep neural network on new input data post-training. However, in some instances when executing a given deep neural network, different operations of the deep neural network may require memory accesses to slower memory (e.g., writing to slower memory, e.g. off-chip memory, and/or reading from slower memory) due to outputs of the operations being too large to store in faster memory, such as an on-chip cache (e.g., L1, L2) on a target device executing the network. For example, an output of a node in the deep neural network may provide data that is too large to store in an on-chip cache of the target device executing the deep neural network and instead such data is stored in slower memory, such as DRAM. Consequently, the deep neural network may perform slower as the data is read and written to DRAM.

Implementations of the subject technology described herein reduce the memory traffic of each operation of a neural network by performing a decomposition process that splits a given operation of a neural network into various operations with outputs that are able to fit within a cache of the target device executing the network. The performance of the neural network may therefore improve by avoiding accessing slower memory (e.g., DRAM), which may be required when the decomposition process is not performed. Advantageously, the accuracy of the network is not impacted by the decomposition process described herein. These benefits therefore are understood as improving the computing functionality of a given electronic device, such as an end user device which may generally have less computational resources available than, e.g., one or more cloud-based servers.

Figure 1:
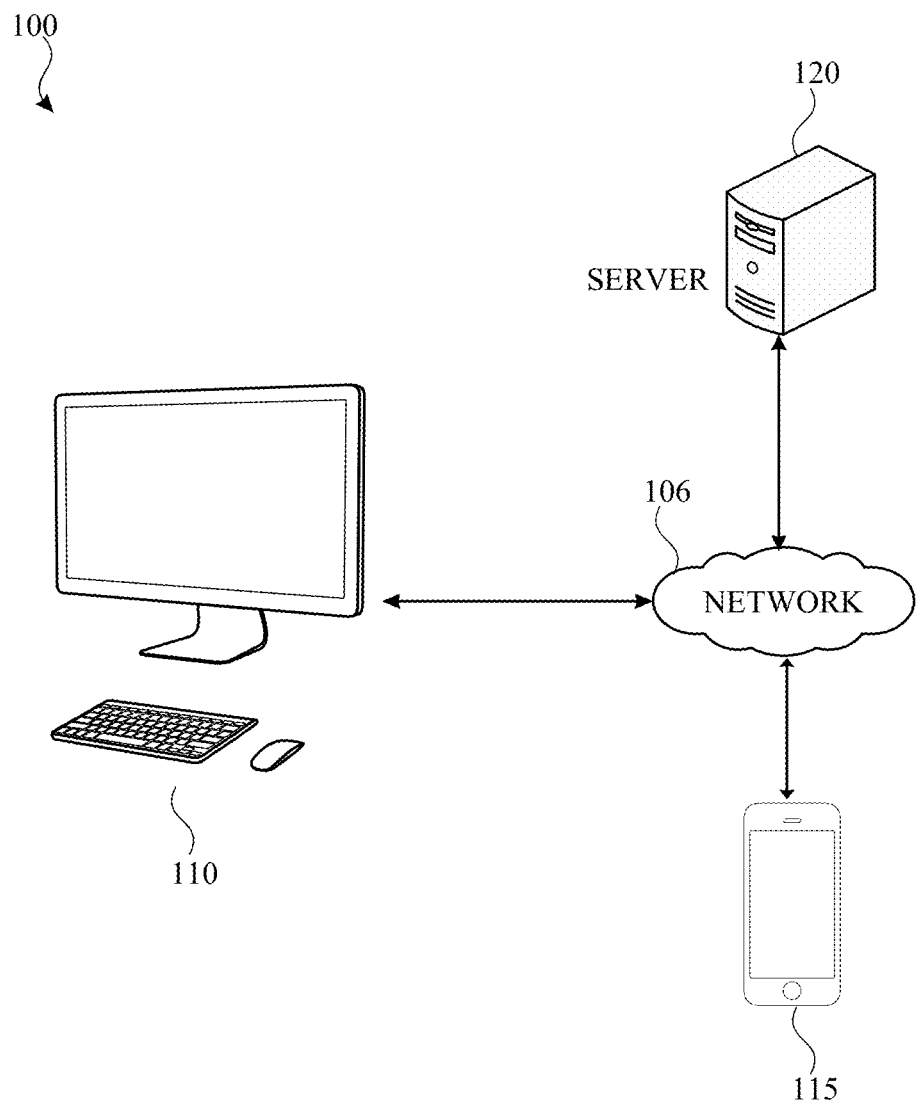
FIG. 1 illustrates an example network environment in accordance with one or more implementations.

FIG. 1 illustrates an example network environment 100 for in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer. The electronic device 110 may be, and/or may include all or part of, the electronic system discussed below with respect to FIG. 7.

In one or more implementations, the electronic device 110 may provide a system for splitting operations from neural network models into code in a particular programming language (e.g., C code, C++ code, Swift code). In particular, the subject system may include a neural network compiler for compiling the code. In an example, the subject system, using the compiled code, can create an executable software package for deployment on a target platform, such as the electronic device 115, with facilitation from the server 120. When executing the compiled code, the target platform can perform a given operation(s) of the neural network model.

The electronic device 115 may be, for example, a portable computing device such as a laptop computer, a smartphone, a peripheral device (e.g., a digital camera, headphones), a tablet device, a wearable device such as a watch, a band, and the like, or any electronic device. The electronic device may further include processors having different compute capabilities, including, for example, a CPU, a GPU, and/or a neural processor. In FIG. 1, by way of example, the electronic device 115 is depicted as a smartphone device. In one or more implementations, the electronic device 115 may be, and/or may include all or part of, the electronic device discussed below with respect to the electronic system discussed below with respect to FIG. 7.

In one or more implementations, the server 120 deploys the compiled code included in an executable software package to a target device for execution. The electronic device 115, in an example, may be a target device for receiving the software package with the compiled neural network code and for executing the compiled code in a runtime environment of the electronic device 115. The electronic device 115 (or any electronic device that is a target device) includes a framework that is enabled to execute operations in the compiled code of the neural network. A framework can refer to a software environment that provides particular functionality as part of a larger software platform to facilitate development of software applications.

Figure 2:
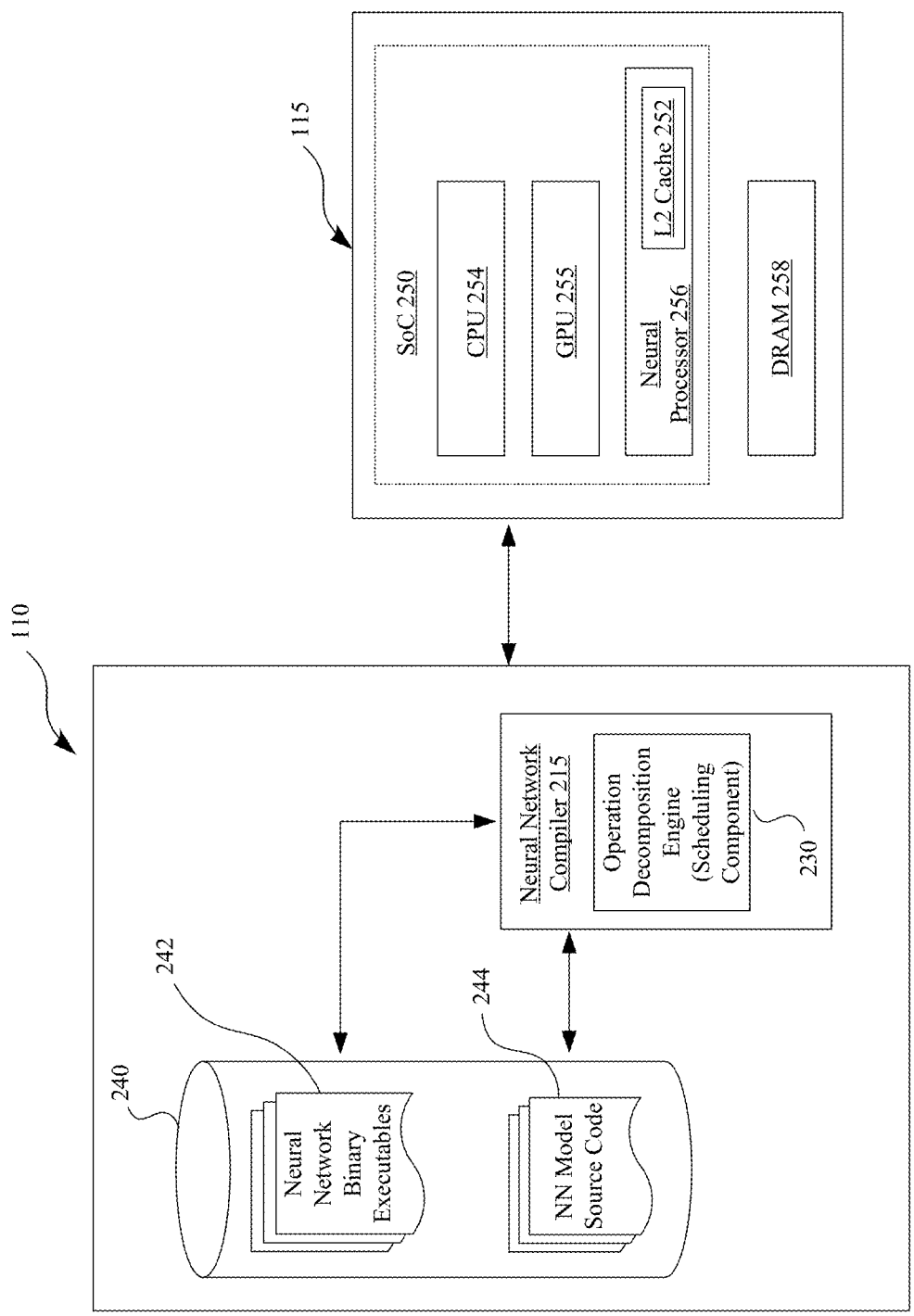
FIG. 2 illustrates an example software architecture for performing a decomposition process for operations of neural networks in accordance with one or more implementations.

FIG. 2 illustrates an example software architecture for performing a decomposition process for operations of neural networks in accordance with one or more implementations. For explanatory purposes, the software architecture is described as being provided by the electronic device 110 of FIG. 1, such as by a processor and/or memory of the electronic device 110; however, the software architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the computing architecture includes a neural network compiler 215. A memory 240 includes neural network (NN) model source code 244, which after being compiled by the neural network compiler 215, generates neural network (NN) binary executables 242 that can be deployed to different target platforms for execution. In an example, the NN model source code 244 may include code for various algorithms, which may be utilized, alone or in combination, to implement particular functionality for executing on a given target device. A target device, as discussed above, may include various hardware sensors and different processors (e.g., as provided by the electronic device 115) that can be utilized when running the NN binary executable 242 on the target device. In an example, the particular functionality may include image processing or computer vision related functionality, speech recognition, natural language processing, etc.

Although the neural network compiler 215 is provided on the electronic device 110 in the example of FIG. 2, in some implementations, such a compiler may be provided on a particular electronic device (e.g., the electronic device 115) that locally compiles source code and executes the compiled code on the same device. In an implementation, the NN model source code 244 can be compiled for a specific target platform and then deployed to a different device such as the electronic device 115 for execution. In an example, the NN model source code 244 can at least include code corresponding to a set of operations that are to be performed by corresponding nodes from each layer of a given NN model. In an example, the code of an operation in a layer of the NN is a respective function call for performing the operation and/or a set of parameters for the function call. Further, code corresponding to input and output feature(s), data structures, and feature types may be included in the NN model source code 244.

As further illustrated, the neural network compiler 215 includes an operation decomposition engine 230, which performs a decomposition process on the NN model source code 244 to split respective operations of nodes of the NN model into various (e.g., operations that produce an output with a reduced size of data to fit in a cache) decomposed operations. The operation decomposition engine 230 also functions as a scheduling component to determine an order for executing the decomposed operations. Such a decomposition process as described herein refers to, for a given operation at a node, generating operations that produce an output with a reduced size (e.g., decomposed operations) that each provide a particular output of a particular size such that the size of the output enables the output to be stored within a cache, such as an on-chip cache, of a target device (e.g., the electronic device 115). In an example, the size of the cache is determined based on the underlying hardware architecture of a given electronic device, such as the L2 cache 252 on the electronic device 115. As such, a respective size of each decomposed operation is constrained by the size of the cache of the electronic device (e.g., the size of the L2 cache 252 on the electronic device 115). Further, the operation decomposition engine 230 performs the decomposition process to ensure that, for the given node, an aggregation of the outputs of the decomposed operations are equal to the output of the operation of the node prior to decomposition. In an implementation, the aforementioned outputs of operations can be in the form of data structures such as a container (e.g., tensor) that can store data in N dimensions (e.g., a matrix, a vector, array, array of arrays, etc.).

The operation decomposition engine 230 can take source code from the NN model source code 244 and perform decomposition of operations corresponding to the nodes of the NN model represented in the NN model source code 244.

In an example, code corresponding to the decomposed operations can be included in the source code. The neural network compiler 215 takes the source code from the operation decomposition engine 230 and compiles the code into a NN binary executable for a target device, which can be stored in neural network binary executables 242 and then be deployed to the target device for execution (e.g., the electronic device 115).

Although the neural network compiler 215 is provided on the electronic device 110 in the example of FIG. 2, in some implementations, such a compiler may be provided on a particular electronic device that compiles code for a neural network model and executes the compiled neural network model on the same device.

As discussed above, a neural network model can be compiled from the NN model source code 244 for a specific target platform and then deployed to a different device such as the electronic device 115 for execution. As further illustrated, the electronic device 115, in an implementation, includes a system-on-chip (SOC) 250. The SoC 250 includes L2 cache 252, a CPU 254, a GPU 255, and a neural processor 256. The electronic device 115 further includes DRAM 258, which is slower access memory than L2 cache 252. Accessing DRAM 258 can consume computing resources by the electronic device 115 as it requires a significant amount of power and may impact performance of the NN model by slow downing memory-bound layers of the NN (e.g., pooling layer, element-wise layer, etc.). In comparison, L2 cache 252 in an implementation is very fast but is significantly smaller in size than DRAM 258. Consequently, often times many outputs of operations of the NN model will not fit in L2 cache 252. For explanatory purposes, the on-chip cache in FIG. 2 is depicted as a L2 cache 252; however, the on-chip cache may be any level cache, e.g. L1, L2, L3, L4, etc. As shown, L2 cache 252 in an implementation is included as part of neural processor 256, and consequently, the L2 cache 252 is not accessible by other processors on SoC 250.

Recently, specialized (e.g., dedicated) hardware has been developed that is optimized for performing particular operations from a given NN. A given electronic device may include a neural processor 256, which can be implemented as circuitry that performs various machine learning operations based on computations including multiplication, adding and accumulation. Such computations may be arranged to perform, for example, convolution of input data. A neural processor, in an example, is specifically configured to perform machine learning algorithms, typically by operating on predictive models such as NNs. In one or more implementations, an electronic device may include a neural processor 256 in addition to a CPU 254 and/or a GPU 255.

A CPU 254, as discussed herein, can refer to a main processor in a given electronic device that performs operations for basic arithmetic, logical, control and input/output operations specified by the instructions of a computer program or application, including some operations for neural network models. A GPU 255, as discussed herein, can refer to a specialized electronic circuit designed to perform operations for rendering graphics, which is also being utilized in many instances to process computational workloads for machine learning operations (e.g., as specified by instructions of a computer program or application). The CPU 254, GPU 255, and neural processor 256 may each have different computational specifications and capabilities depending on their respective implementations where each of the aforementioned components can provide varying degrees of performance for certain operations in comparison with the other components.

As discussed herein, a convolutional neural network refers to a particular type of neural network, but uses different types of layers made up of nodes existing in three dimensions where the dimensions may change between layers. In a convolutional neural network, a node in a layer may only be connected to a subset of the nodes in a previous layer. The final output layer may be fully connected and be sized according to the number of classifiers. A convolutional neural network model may include various combinations, and in some instances, multiples of each, and orders of the following types of layers: the input layer, convolutional layers, pooling layers, rectified linear unit layers (ReLU), and fully connected layers. Part of the operations performed by a convolutional neural network includes taking a set of filters (or kernels) that are iterated over input data based on one or more parameters. In an example, the depth of a convolutional layer may equal the number of filters used. It is appreciated that the sizes of the different volumes at each layer may be mathematically determined given the hyper-parameters of a convolutional neural network.

Convolutional neural networks are often run on cloud-based computing platforms due to the volume of data being processed. In such instances, memory management is often an after-thought because cloud-based systems do not have practical memory concerns (e.g., more computing power/memory is readily available). In contrast, storing all the weights and resulting node values of convolutional neural network in memory on a memory limited device (e.g., a mobile electronic device such as a smartphone) may not be possible or practical.

Figure 3:
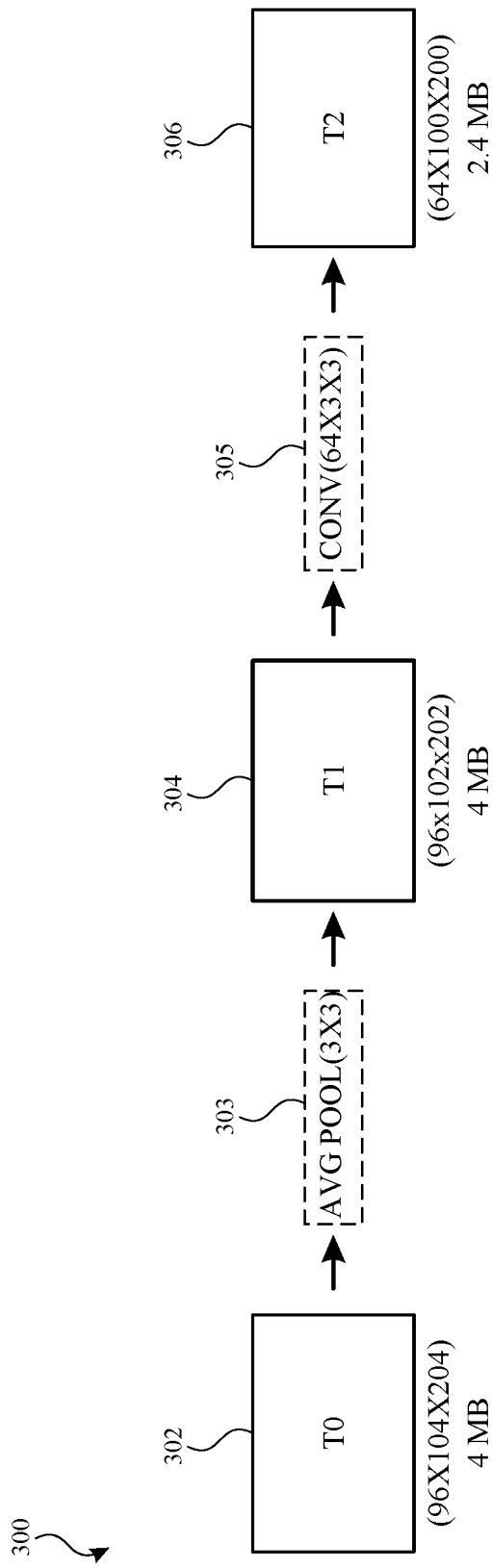
FIG. 3 illustrates an example flow of data from various nodes in a portion of a neural network in accordance with one or more implementations.

FIG. 3 illustrates an example flow of data from various nodes in a portion of a neural network 300 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the portion of the neural network 300 includes data 302, data 304, and data 306. The portion of the neural network 300 includes a pooling layer 303 and a convolution layer 305. In the example of FIG. 3, the portion of the neural network 300 has yet to undergo a decomposition process by the operation decomposition engine 230. At time t0, data 302 corresponds to an output with a size of 4 megabytes (MB). At time t1, data 304 corresponds to an output with a size of 4 megabytes (MB). At time t2, data 306 corresponds to an output with a size of 2.4 megabytes (MB). In FIG. 3, without utilization of a cache, 8 MB of data passes between the pooling layer 303 and the convolution layer 305. In an example, the pooling layer 303 performs a pooling operation on data 302 which is received as input data by the pooling layer 303. A pooling operation can include a max pooling operation (e.g., reporting a maximum output within a rectangular neighborhood), average of a rectangular neighborhood, a Euclidean norm of a rectangular neighborhood, or a weighted average based on a distance from a central pixel. The convolution layer 305 performs a convolution operation on data 304, and provides data 306 as output. A convolution operation can include performing an affine transform and/or filtering in an example.

The following discussion describes examples of the decomposition process, or how to reconstruct such a mechanism.

The following steps are provided for a simple convolution with optional padding. In this example, generalization can account for the other parameters (strides):
1) Define the "logical region" to be a coordinate range plus padding (if any) on all directions (top, right, bottom, left).
2) Construct a function that identifies the logical region of input needed to produce a logical region of the output.
3) Applied recursively in a bottom-up fashion (last operator's output towards first operator's input) reveals all the involved regions.

For the example of FIG. 3, the following process could be performed:
Pick up splitting factors height=50, width=200
this defines two regions: (0,0,0) . . . (63,49,199) and (0,50,0) . . . (63,99,199)
regions here given in (channel, height, width) form; 0-based
For the last operator (convolution 3×3)
(0,0,0) . . . (63,49,199) of 306 (T2) requires input (0,0,0) . . . (95,51,201) from 304 (T1)
(0,50,0) . . . (63,99,199) of 306 (T2) requires input (0,50,0) . . . (95,101,201) from 304 (T1)
For the first operator (pooling 3×3)
(0,0,0) . . . (95,51,201) of 304 (T1) requires input (0,0,0) . . . (95,53,203) from 203 (T0)
(0,50,0) . . . (95,101,201) of 304 (T1) requires input (0,50,0) . . . (95,103,203) from 203 (T0)
The intermediate/temporary tensors, i.e. T1(a) and T1(b), will have the dimensions of their corresponding regions:
404 (T1(a)) which logically is (0,0,0) . . . (95,51,201) of 304 (T1), is 96×52×202
405 (T1(a)) which logically is (0,50,0) . . . (95,101,201) of 304 (T1), is 96×52×202

In the above example, the presence of input strides enlarges the regions of input needed, while the presence of padding means that some regions may have exhibit padding while others not.

Figure 4:
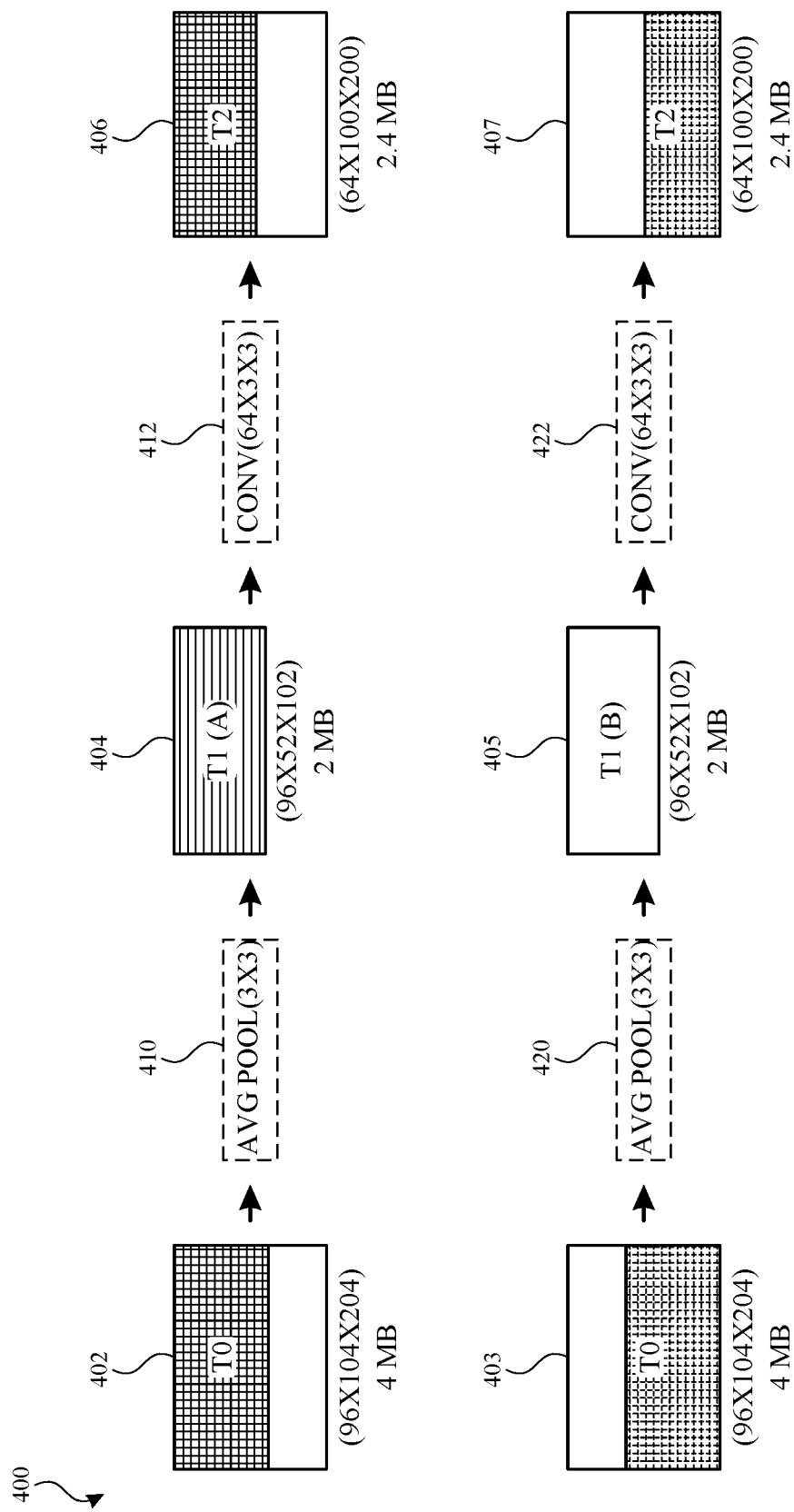
FIG. 4 illustrates an example flow of data after the portion of the neural network described in FIG. 3 has undergone a decomposition process in accordance with one or more implementations.

FIG. 4 illustrates an example flow of data 400 after the portion of the neural network 300 described in FIG. 3 has undergone a decomposition process in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. FIG. 4 will be discussed by reference to components of FIG. 3.

In the example of FIG. 4, the operation decomposition engine 230 has performed a decomposition process on the pooling layer 303 and the convolution layer 305 of the portion of the neural network 300 in FIG. 3. For example, the pooling layer 303 has been split into pooling layer 410 and pooling layer 420. In this manner, pooling layer 410 and pooling layer 420 have been generated as a result of the decomposition process by the operation decomposition engine 230. Further, the convolution layer 305 has been split into convolution layer 412 and convolution layer 422, which are the result of the decomposition process by the operation decomposition engine 230.

As further shown, data 402 is provided as input to the pooling layer 410 that performs a pooling operation. The pooling layer 410 provides data 404 as output, which is received as input data to the convolution layer 412. The convolution layer 412 performs a convolution operation on data 404 and provides data 406 as output.

As further shown, data 403 is provided as input to the pooling layer 420 that performs a pooling operation. The pooling layer 420 provides data 405 as output, which is received as input data to the convolution layer 422. The convolution layer 422 performs a convolution operation on data 405 and provides data 407 as output.

As shown in FIG. 4, the shaded regions corresponding to data 406 and data 407 are (64×50×100) each. In this example, data 406 and data 407 correspond to data 306 (T2) in FIG. 3. The shaded regions are projected against data 306 T2, because the results are stored into the original T2 corresponding to data 306. Thus, T2 is not decomposed, and only the computations are decomposed in this example.

Further, in this example, T0 (e.g. corresponding to data 302) is not decomposed into smaller objects, and T0 is read directly from the region that is needed for the computation. As illustrated, the shaded regions in data 402 and data 403 are (96×54×104) each, and together data 402 and data 403 comprise data 302 (T0). These two regions are overlapping with each other in this example.

In the example of FIG. 4, every object produced is 2 elements smaller in both height and width than its input. The kind of layer, kernel dimensions, strides and padding dictate how much input will be needed per 1×1 output. While in the example the amount of input is the same for both of the CONV and POOL layers, this is only shown as such for simplicity.

In the example of FIG. 4, data 404 and data 405 have common elements (the two middle rows). This is indeed redundant computation and redundant reads against T0. Convolution layer 412 and convolution layer 422 use the same coefficients for the convolution in this example, these coefficients are also read from DRAM.

Figure 5:
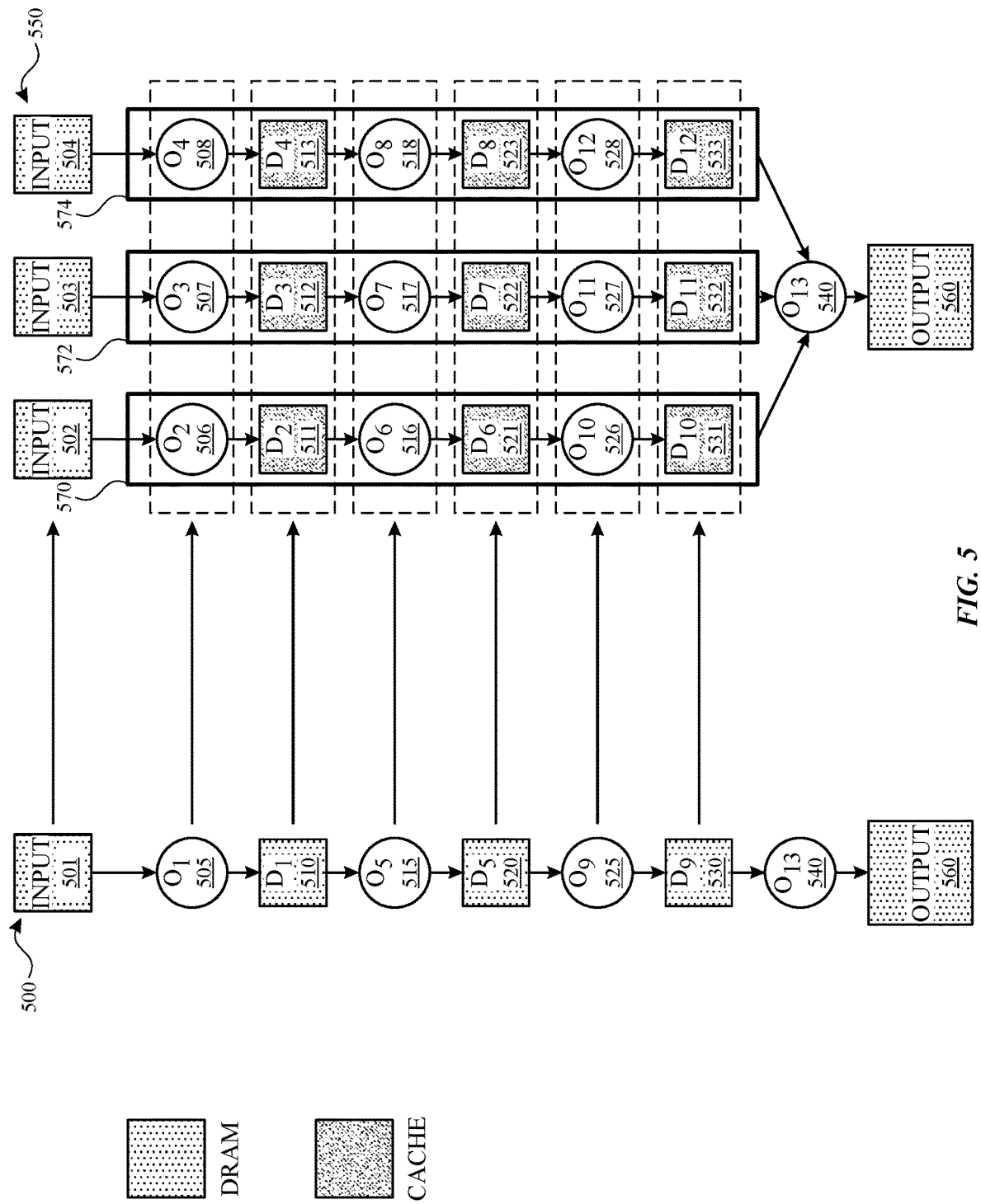
FIG. 5 illustrates an example of a first neural network and a second neural network that has undergone a decomposition process in accordance with one or more implementations.

FIG. 5 illustrates an example of a neural network 500 and a neural network 550 that has undergone a decomposition process in accordance with one or more implementations.

A neural network (NN) may be represented in a directed graph with a single path (e.g., a producer/consumer chain) including 1) respective nodes representing operations of layers of the NN and 2) other nodes representing respective outputs of each of the operation nodes. In such a graph, a node representing the output of one node (corresponding to an operation) is to consumed by a subsequent node corresponding to a different operation in the graph. The following example illustrates this concept:
[Node 1: Operation 1]→[Node 2: Output of Operation 1]→[Node 3: Operation 2]→[Node 4: Output of Operation 2] . . . etc.

In the above example, memory (e.g., cache or DRAM) is needed for storing outputs corresponding to Node 2 and Node 4. The operation decomposition engine 230 of the NN compiler 215 determines how to split operation in each layer of the NN 500 into multiple branches where each branch include multiple operations, and where objects generated by operations in each branch will fit into the cache on the target device (e.g., L2 cache 252). In an example, the aggregate of the outputs of the branches are mathematically equivalent to the corresponding operation in the layer of the NN (e.g., the original NN that was prior to being split into branches). Further, each branch is fully executed before switching to execute another branch.

The operation decomposition engine 230 determines 1) sizes of the objects corresponding to input or output data, and 2) the order of the objects to enable storing such objects into cache, which is directly accessed from the SoC 250 in an implementation. Memory traffic to DRAM (e.g., DRAM 258) is reduced as such objects are stored using the cache (e.g., L2 cache 252) when possible.

The operation decomposition engine 230 determines the tradeoff between 1) generating more branches as each branch introduces additional computation overhead for redundant operations or 2) executing the operation without splitting into multiple operations and incur the cost of slower memory access in DRAM for data that does not fit in the cache. Temporary objects are determined by the neural network compiler 215 to ensure such objects are short-lived (e.g., generated and consumed in a short amount of time, and then go away to free up cache memory).

In an example, the operation decomposition engine 230 determines a first set of operations for the respective operation, and determines a second set of operations for the respective operation. The operation decomposition engine 230 selects one of the first set of operations or the second set of operations based at least in part on an analysis of the first set of operations and the second set of operations. In an example, the analysis can indicate which of the first set of operations and the second set of operations that utilizes fewer resources (e.g., memory) to facilitate the selection by the operation decomposition engine 230.

In an example, CNN operators shrink, leave the same, or even expand the dimensions of their output (all three dimensions). This can have an adverse effect on splitting the output and the number of operators involved in the "chain". The more dissimilar the input/output dimensions, the less effective the L2 cache space utilization and the greater the number of "branches". Branch count affects the overall mechanism since each branch incurs additional coefficient re-reads and extra computation. This is one reason why smaller "chains" should also examined.

In an example, the operation decomposition engine 230 first finds a chain of operations that appear in this producer/consumer pattern shown in FIG. 3: T0→T1→ . . . T_n This chain can include N>=2 operators, N+1 tensors, and N−2 intermediate tensors.

The operation decomposition engine 230 then examines if any intermediate tensors T_i (0<i<n) are not guaranteed to be allocated L2. Given an intermediate tensor T_i, if the combined size of either (T_(i−1) AND T_i) or (T_i AND T_(i+1)) exceeds L2, then T_i (along T_(i−1) and T_(i+1)) are not guaranteed in L2.

As discussed previously, there can be a redundancy in memory accesses against T0 shown in the previous figures. When T0 may end in DRAM, this modifies the savings of getting the chain's intermediates in L2 through decomposition. As a result, the original chain may be pruned and in order to operate on a section of it, i.e. instead of T0→ . . . T8 and utilizing T0→ . . . T2 and T5→T8, if so determined.

As shown in the example of FIG. 5, the neural network 500 includes intermediate layers 505, 515, and 525. The intermediate layers 505, 515, and 525 may be different types of layers such as convolutional layers, ReLU layers, pooling layers, fully connected layers, etc., which perform respective operations corresponding to the type of layer. Accordingly, the aforementioned intermediate layers may have different dimensions. As further illustrated, input data 501 and output data 560 are stored in DRAM. Prior to the decomposition process, the neural network 500 stores data 510, data 520, and data 530 into DRAM as the respective sizes of the aforementioned data does not fit within cache memory.

The neural network 500 also illustrates the dependencies between different intermediate layers. Thus, intermediate layer 515 uses the output of intermediate layer 505 (e.g., data 510), and intermediate layer 525 uses the output of intermediate layer 515.

The operation decomposition engine 230 performs a decomposition process on the intermediate layer 505 and splits the operation $O_1$ into three operations $O_2$, $O_3$, and $O_4$ corresponding to intermediate layer 506, intermediate layer 507, and intermediate layer 508, respectively. In an example, the operation $O_1$ corresponds to a pooling layer operation and the operation $O_2$, operation $O_3$, and operation $O_4$ each are a respective pooling layer operation with various hyper-parameters (e.g., spatial intent, and/or stride) that affect a size of an output of the corresponding pooling layer operation.

Given a chain, operation decomposition engine 230 determines the DRAM traffic involved. In an implementation, the DRAM traffic involved is due to: 1) Tensors that are not guaranteed in L2; and 2) Certain operations that have kernel coefficients (mostly convolution or convolution layers).

In an example, when the output (T_n) is split in parts (2 parts in the beginning, then 3, 4, . . . ), and then computing all the intermediate tensor sizes and all the regions involved, until a "splitting factor" is determined that guarantees that the DRAM traffic will go down.

For convolutions or convolution layers, in particular, the kernel coefficients may have to be re-read from DRAM and this has to be accounted for in an implementation.

Next, the operation decomposition engine 230 performs a decomposition process on the intermediate layer 515 and splits the operation $O_5$ into three operations $O_6$, $O_7$, and $O_8$ corresponding to intermediate layer 516, intermediate layer 517, and intermediate layer 518, respectively.

Additionally, the operation decomposition engine 230 performs a decomposition process on the intermediate layer 525 and splits the operation $O_9$ into three operations $O_{10}$, $O_{11}$, and $O_{12}$ corresponding to intermediate layer 526, intermediate layer 527, and intermediate layer 528, respectively.

In this example, the operation decomposition engine 230 can group the decomposed operations into different branches of execution for the network. For example, branch 570 includes the intermediate layer 506, intermediate layer 516, and intermediate layer 526. Additionally, branch 572 includes the intermediate layer 507, intermediate layer 517, and intermediate layer 527. Further, branch 574 includes the intermediate layer 508, intermediate layer 518, and intermediate layer 528.

For providing input data to the initial set of intermediate layers, the operation decomposition engine 230 performs a decomposition process on data 501. As illustrated, data 501 is split into data 502, data 503, and data 504 which are provided as input data to intermediate layer 506, intermediate layer 507, and intermediate layer 508, respectively, when the network is executed on the target device.

The following discussion describes the flow of data throughout the network. Each of intermediate layer 506, intermediate layer 507, and intermediate layer 508 performs a respective operation and generates, as output, data 511, data 512, and data 513, respectively. As illustrated, data 511, data 512, and data 513 are provided to intermediate layer 516, intermediate layer 517, and intermediate layer 518, respectively. Each of intermediate layer 516, intermediate layer 517, and intermediate layer 518 performs a respective operation and generates, as output, data 521, data 522, and data 523, respectively. Further, as illustrated, data 521, data 522, and data 523 are provided to intermediate layer 526, intermediate layer 527, and intermediate layer 528, respectively. Each of intermediate layer 526, intermediate layer 527, and intermediate layer 528 performs a respective operation and generates, as output, data 531, data 532, and data 533, respectively.

For each branch, the decomposition process performed by the operation decomposition engine 230 has split up the original intermediate layers into multiple operations in which respective intermediate layers from each branch provide output data that are able to fit in the cache as illustrated in FIG. 5 thereby minimizing the utilization of memory bandwidth on the target device (e.g., by forgoing memory access to slower DRAM).

In this example, the operation decomposition engine 230 determines an order to perform each of the operations corresponding to the intermediate layers of the aforementioned branches. For example, the operation decomposition engine 230 can determine in which order to execute branch 570, branch 572, and branch 574. Each branch executes fully before another branch is selected for execution in an implementation.

As further illustrated, output layer 540 receives data 531, data 532, and data 533. The aggregate of data 531, data 532, and data 533 is equivalent to data 530 in the neural network 500, which ensures that the accuracy of the neural network 550 is not impacted by the decomposition process. In this example, output layer 540 in the neural network 500 and the neural network 550 perform the same operation in order to provide output data 560 (which are the equivalent data in both of the networks in FIG. 5). In an example, data 531, data 532, and data 533 can be aggregated by summing each of the aforementioned data together or using a depth concatenation technique to provide output data 560.

In an implementation, there is no "aggregation" per se (e.g., no extra movement/copy). For example, when the output is split, the computation is split into regions (e.g., shaded regions of T2 in FIG. 4); the results are written directly into the final buffer (T2).

In an implementation, these logical regions have coordinates. Data 407, for instance, corresponds to the T2 region starting at (50,0) though and including (99,199) using 0-based indexing and (height, width) orientation. Further, when convolution layer 422 produces results, these results are directed into T2.

In an implementation, the decomposed operations (e.g., additional branches of layers corresponding to the operations performed for each branch including the order of executing each of the branches) of neural network 550 may be included with the code of the network for compiling into a binary executable.

Figure 6:
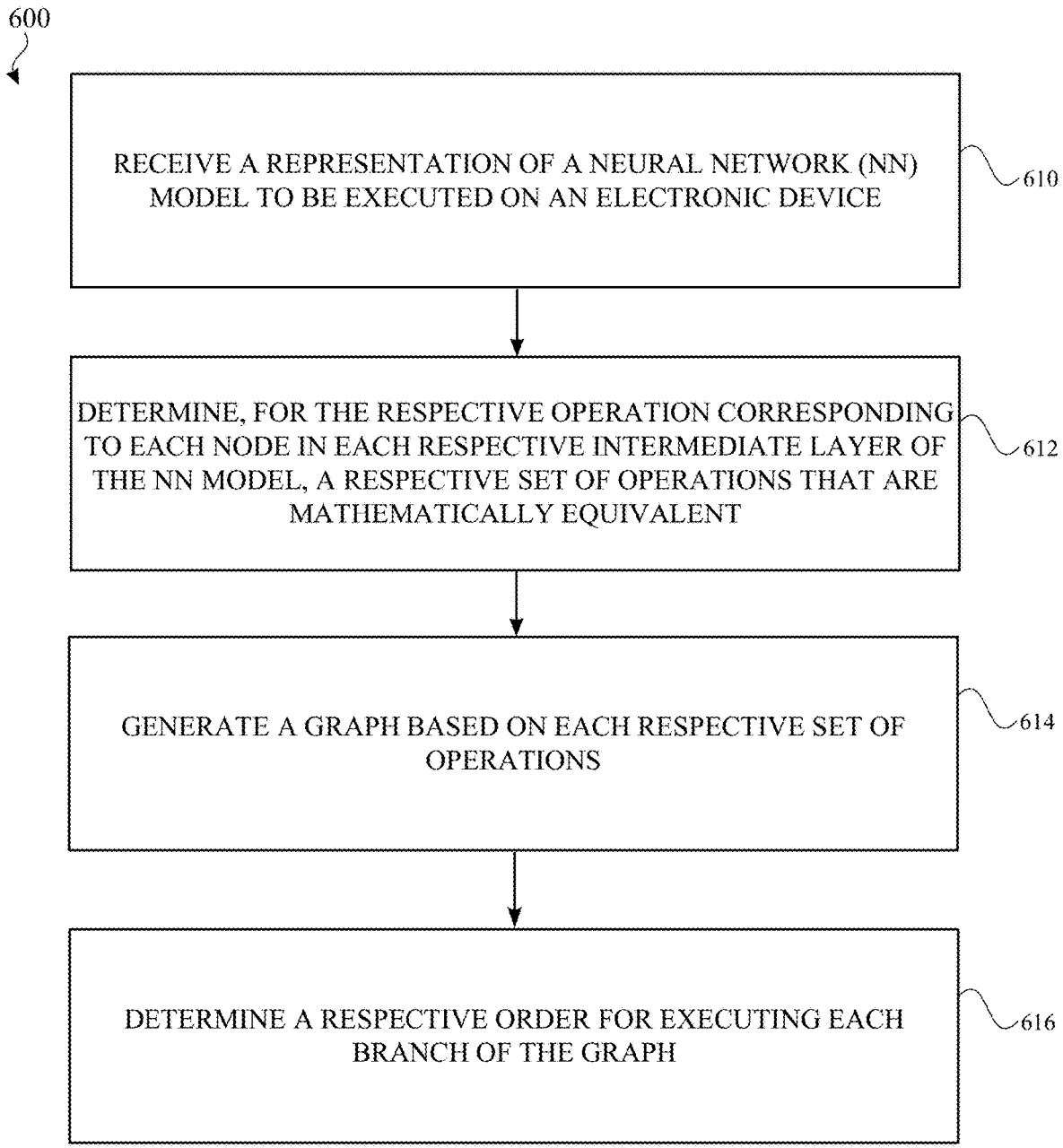
FIG. 6 illustrates a flow diagram of an example process for performing a decomposition process for a neural network in accordance with one or more implementations.

FIG. 6 illustrates a flow diagram of an example process 600 for performing a decomposition process for a neural network in accordance with one or more implementations. For explanatory purposes, the process 600 is primarily described herein with reference to components of the software architecture of FIG. 2, which may be executed by one or more processors of the electronic device 110 of FIG. 1. However, the process 600 is not limited to the electronic device 110, and one or more blocks (or operations) of the process 600 may be performed by one or more other components of other suitable devices, such as by the electronic device 115. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The operation decomposition engine 230 receives a representation of a neural network (NN) model to be executed on an electronic device (610). In an example, the representation of the NN model includes nodes corresponding to intermediate layers of the NN model, where at least some of the nodes each corresponds to a respective operation of a respective intermediate layer of the NN model to be performed by the electronic device.

The operation decomposition engine 230 determines, for the respective operation corresponding to each node in each respective intermediate layer of the NN model, a respective set of operations that are mathematically equivalent to the respective operation such that an aggregation of outputs of the respective set of operations is equivalent to an output of the respective operation (612).

The operation decomposition engine 230 generates a graph based on each respective set of operations, where the graph includes a set of branches, each branch includes a plurality of operations, the plurality of operations including a particular operation from each respective set of operations (614).

The operation decomposition engine 230 determines a respective order for executing each branch of the graph (616).

Figure 7:
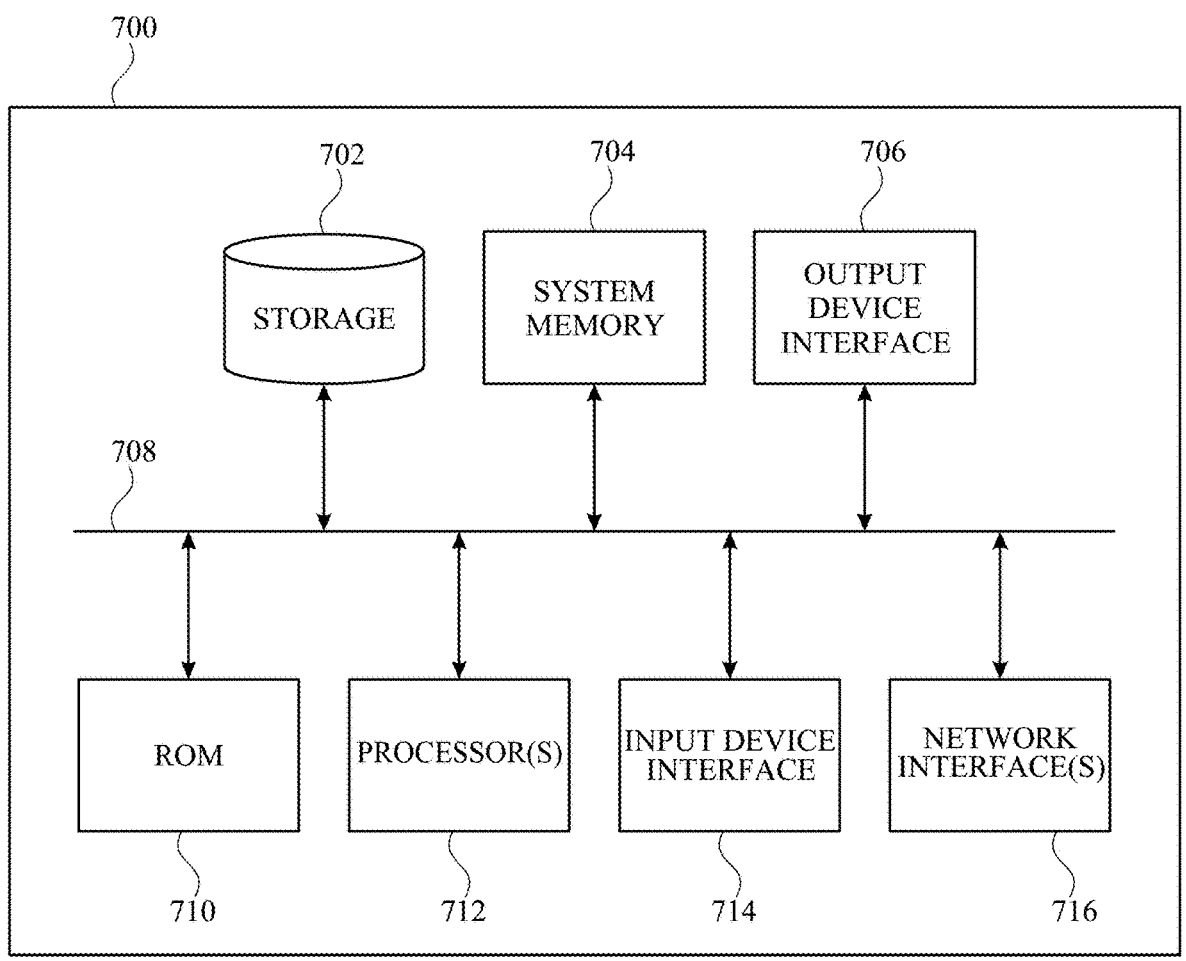
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of, the electronic device 110, the electronic device 115, and/or the server 120 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 115 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

One aspect of the present technology may include applying machine learning and/or compiler techniques that may perform operations on user data. The present disclosure contemplates that in some instances, this user data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used perform machine learning tasks that provide results (e.g., predictions) that are of interest to the user. Accordingly, use of such personal information data enables users to have greater control of the delivered results. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be accessed for legitimate uses only. Further, such access should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data that may be attempted to be accessed by the components of the system described herein. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the access of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    receiving a representation of a neural network (NN) model to be executed on an electronic device, the representation of the NN model including nodes corresponding to intermediate layers of the NN model, wherein at least some of the nodes each corresponds to a respective operation of a respective intermediate layer of the NN model to be performed by the electronic device;
    determining, for the respective operation corresponding to at least one node in at least one respective intermediate layer of the NN model, a respective set of operations that are mathematically equivalent to the respective operation such that an aggregation of outputs of the respective set of operations is equivalent to an output of the respective operation, wherein the determining, for the respective operation corresponding to the at least one node in the at lease one respective layer of the NN model comprises:
        determining a first plurality of operations for the respective operation;
        determining a second plurality of operations for the respective operation; and
        selecting one of the first or second plurality of operations based at least in part on an analysis of the first and second plurality of operations, wherein the analysis is based at least in part on statistics indicating computational overhead and memory accesses and the analysis indicates which of the first or second plurality of operations utilize fewer memory resources;
    generating a graph based on each respective set of operations, wherein the graph includes a set of branches, at least one branch includes a plurality of operations, the plurality of operations including a particular operation from each respective set of operations;
    determining a respective order for executing each branch of the graph; and
    storing the graph and the respective order.

2. The method of claim 1, further comprising:
    compiling a binary package for the electronic device based at least in part on the graph and the respective order for executing each branch of the graph, wherein the electronic device performs each respective set of operations based on the respective order.

3. The method of claim 1, wherein
    selecting one of the first or second plurality of operations based on a set of heuristics that utilize the statistics.

4. The method of claim 1, wherein an output of each operation from the respective set of operations is constrained based at least in part on an amount of available memory in a cache of the electronic device.

5. The method of claim 4, wherein the aggregation of the outputs of the respective set of operations is stored in memory of the electronic device, the memory being slower memory than the cache of the electronic device.

6. The method of claim 1, wherein the plurality of operations of each branch start after an input node of the NN model and end before an output node of an output layer of the NN model.

7. The method of claim 1, wherein the plurality of operations of each branch provides a portion of an output of the NN model from an output layer.

8. The method of claim 7, wherein an aggregation of each output of each branch is equal to the output of the NN model from the output layer.

9. The method of claim 8, wherein the output of the NN model from the output layer is stored in dynamic random access memory (DRAM).

10. The method of claim 1, wherein the electronic device includes cache memory and dynamic random access memory (DRAM).

11. A system comprising:
    a processor;
    a memory device containing instructions, which when executed by the processor cause the processor to:
        receive a representation of a neural network (NN) model to be executed on an electronic device, the representation of the NN model including nodes corresponding to layers of the NN model, wherein at least one of the nodes corresponds to an operation of a corresponding layer of the NN model to be performed by the electronic device;
determine a set of operations that is mathematically equivalent to the operation such that an aggregation of outputs of the set of operations is equivalent to an output of the operation, wherein the determining the set of operations comprises:
  determining a first plurality of operation for the operation;
  determining a second plurality of operations for the operation; and
  selecting one of the first or second plurality of operations based at least in part on an analysis of the first and second plurality of operations, wherein the analysis is based at least in part on statistics indicating computational overhead and memory accesses and the analysis indicated which of the first or second plurality of operations utilize fewer memory resources;
generate a graph based on the set of operations, wherein the graph includes a set of branches, each branch includes a plurality of operations including at least one operation from the set of operations;
determine a respective order for executing each branch of the graph; and
store the graph and the respective order for executing each branch of the graph for compilation of the NN model.

12. The system of claim 11, wherein the memory device contains further instructions, which when executed by the processor further cause the processor to:
compile a binary package for the electronic device based at least in part on the graph and the respective order for executing each branch of the graph, wherein the electronic device performs each of the respective pluralities of operations based on the respective order.

13. The system of claim 11, wherein to select one of the first or second plurality of operations is further based on a set of heuristics that utilize the statistics.

14. The system of claim 11, wherein an output of each operation from the set of operations is constrained based at least in part on an amount of available memory in a cache of the electronic device.

15. The system of claim 14, wherein the aggregation of outputs of the set of operations is stored in memory of the electronic device, the memory being slower memory than the cache of the electronic device.

16. The system of claim 11, wherein the set of operations start after an input node of the NN model and end before an output node of an output layer of the NN model.

17. The system of claim 11, wherein the set of operations of each branch provides a portion of an output of the NN model from an output layer.

18. The system of claim 17, wherein an aggregation of each output of each branch is equal to the output of the NN model from the output layer.

19. The system of claim 18, wherein the output of the NN model from the output layer is stored in DRAM.

20. A non-transitory computer-readable medium comprising instructions, which when executed by a computing device, cause the computing device to perform operations comprising:
receiving a representation of a neural network (NN) model to be executed on an electronic device, the representation of the NN model including nodes corresponding to layers of the NN model, wherein at least some of the nodes each corresponds to a respective operation of a respective layer of the NN model to be performed by the electronic device;
determining, for the respective operation corresponding to at least one node in layer of the NN model, a respective set of operations that is mathematically equivalent to the respective operation such that an aggregation of outputs of the respective set of operations is equivalent to an output of the respective operation, wherein the determining, for the respective operation corresponding to at least one node in at least one layer of the NN model, the respective set of operations comprises:
  determining a first plurality of operations for the respective operation;
  determining a second plurality of operations for the respective operation; and
  selecting one of the first or second plurality of operations based at least in part on an analysis of the first and second plurality of operations, wherein the analysis is based at least in part on statistics indicating computational overhead and memory accessed and the analysis indicates which of the first or second plurality of operations utilize fewer memory resources;
generating a graph based on each respective set of operations, wherein the graph includes a set of branches, each branch includes a plurality of operations, the plurality of operations including a particular operation from each respective set of operations; and
determining a respective order for executing each branch of the graph.

* * * * *